(No Model.)
B. O. SMITH.
HAME FASTENER.
No. 527,131.  Patented Oct. 9, 1894.
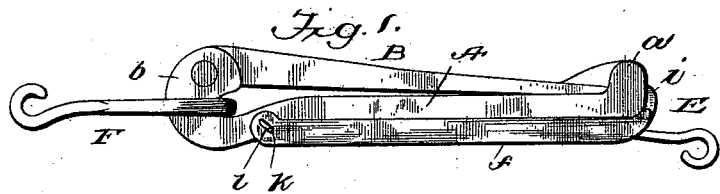
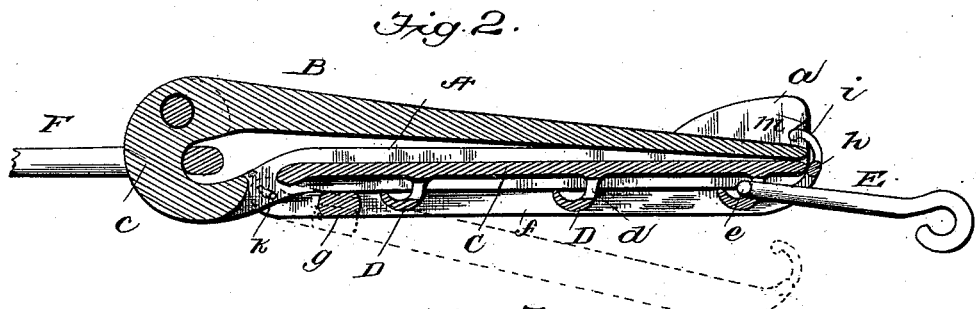
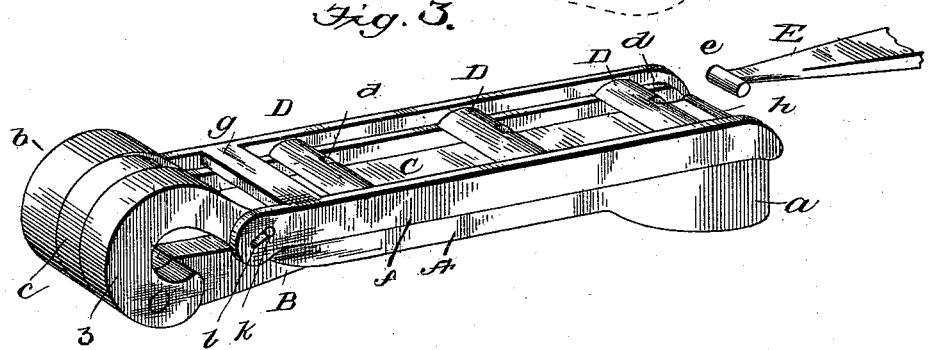
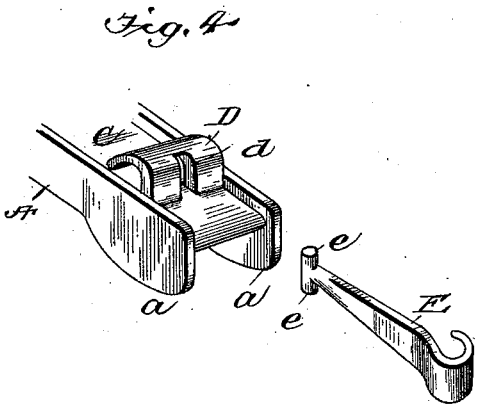
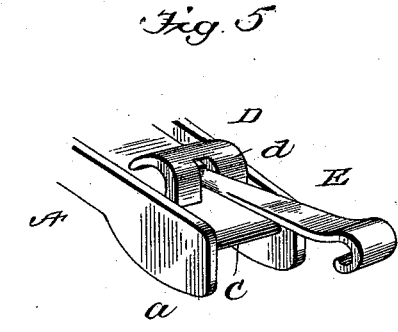
Witnesses
Inventor
Benjamin O Smith.
by W. A. Redwood, Attorney

UNITED STATES PATENT OFFICE.

BENJAMIN O. SMITH, OF KANSAS CITY, MISSOURI.

HAME-FASTENER.

SPECIFICATION forming part of Letters Patent No. 527,131, dated October 9, 1894.

Application filed November 17, 1893. Serial No. 491,205. (No model.)

*To all whom it may concern:*

Be it known that I, BENJAMIN O. SMITH, a citizen of the United States, residing at Kansas City, in the county of Jackson and State of Missouri, have invented certain new and useful Improvements in Hame-Fasteners; and I do hereby declare the following to be a full, clear, and exact description of the invention, such as will enable others skilled in the art to which it appertains to make and use the same.

My invention relates generally to hame-fasteners and particularly to that class of fasteners in which a hooked lever is employed to draw the ends of the hames together after the hooks have been connected to the loops in the ends of the hames, and it has for its object to provide a metallic hame fastener adapted to maintain its position on the collar at all times without liability of accidental displacement, and it consists of the parts and combination of parts hereinafter described and claimed.

In the accompanying drawings forming a part of this specification—Figure 1 is a side elevation of my improved device; Fig. 2, a longitudinal vertical section on an enlarged scale; Fig. 3, perspective view of the device complete; Fig. 4, a perspective detail view of one end showing the hook detached; and Fig. 5, a similar view showing the hook attached.

Similar letters refer to similar parts throughout the several views.

A represents a metal bar formed with the flanges $a$ at one end, and terminating in the bifurcated hooks $b$ at the other end between which is pivoted the hook end, $c$, of a lever B. The bar A is cast with a solid connecting piece C from the under side of which projects the hooks D in the center of which is formed the straight slots $d$, as best shown in Figs. 4 and 5, to receive the short trunnions or pintles $e$ cast on the end of the hook E which connects one end of the fastener to one end of the hame, said hooks E being turned as shown in Fig. 4, and the trunnions passed through the slot in the hook D and given a quarter turn so as to cause the pintles or trunnions to extend across the slot, thus getting a bearing on the hook D at each side of the slot and preventing the hook E from being withdrawn till the said hook is again turned to bring its pintles in line with the slot.

The hook E may be attached in the manner described to any one of the hooks D in order to accommodate the size of the collar on which the hame is used.

The lever B is used in connection with the loop hook F which is connected to the other end of the hame in a well known manner and needs no description here, but said lever as ordinarily used has no means for securing its free end against flying open when the collar is lifted or stands out from the neck of the animal in going down a hill or in backing, thus frequently causing the fastening to open and permit the hame to drop or be pulled off the collar. In order to prevent such accidental displacement of the hame I provide the frame consisting of the side bars $f$ which are connected near one end by the bar $g$ and at the other end by a bar $h$ at the center of which a rearwardly extending projection $i$ provided with thumb or finger hold, $m$, is cast adapted to overlap the end of the bar A and rest on the end of the lever B in order to hold the same down between the flanges $a$ when the parts are in their operative position. The frame is pivotally secured to the bar A by means of slots $k$ formed in the side bars $f$ through which headed pins $l$ extend from the bar A. The bars $f$ are arranged so as to stand on the same plane as the hooks D thus preventing the latter wearing the collar.

In operation the fastener is first attached to one of the hooks D and is then attached to one end of the hame. The hook F is caught in the loop or eye therefor on the other end of the hame and the free end of the lever B passed through the loop of the hook and pressed down between the flanges $a$ of the bar thus forming the connection between the two ends of the hame. The frame G is then drawn out on the pins $l$ past the end of the bar A and inwardly against the bar till its projection $i$ stands on a plane above that of the end of the lever when the operator grasps the thumb or finger hold, $m$, on the projection and pushes or draws the frame back to cause said projection to rest on the end of the lever as shown in Fig. 2, thereby locking the same against outward movement. The hook E serves to assist in holding the frame in position by bearing against the bar $h$ thereon.

Having thus described my invention, what I claim as new, and desire to secure by Letters Patent, is—

A hame fastener comprising a bar having a bifurcated hook-shaped end, flanges at its opposite end, and hooks having straight slots formed therein projecting from its rear side, a hook having trunnions cast therewith adapted to enter said slots, a hook lever pivoted to said bar, and a frame consisting of the side bars formed with slots at one end, and a connecting bar at the other end of said side bars provided with a rearwardly extending projection, whereby said frame may be pivotally and adjustably secured to the bar A, substantially as described.

In testimony whereof I affix my signature in presence of two witnesses.

BENJAMIN O. SMITH.

Witnesses:
J. F. BEALE,
B. T. WELCH, Jr.